United States Patent [19]
Meier

[11] 3,918,771
[45] Nov. 11, 1975

[54] PIVOT BEARING
[75] Inventor: Johann Meier, Brione sopra Minusio, Switzerland
[73] Assignee: Precise AG Rechenmaschinenfabrik, Zurich, Switzerland
[22] Filed: July 3, 1974
[21] Appl. No.: 485,604

[30] Foreign Application Priority Data
July 7, 1973  Switzerland.......................... 9872/73

[52] U.S. Cl............................. 308/2 A; 177/DIG. 9
[51] Int. Cl.² .......................................... F16C 11/12
[58] Field of Search............. 308/2 R, 2 A; 177/246, 177/DIG. 9

[56] References Cited
UNITED STATES PATENTS
3,421,595  1/1969  Kuhnle et al..................... 308/2 R X
3,727,995  4/1973  Ruefenacht............................ 308/2
3,758,173  9/1973  Bucher................................ 308/2 R
3,815,695  6/1974  Schwarz............................. 308/2 X Primary Examiner—M. Henson Wood, Jr.
Assistant Examiner—Gene A. Church
Attorney, Agent, or Firm—Eric P. Schellin

[57] ABSTRACT

A pivot bearing assembly, for use in measuring equipment, in which bearing a supporting member rests on a bearing member for pivotal movement relative to the bearing member about a given pivotal axis, flexible retaining means being provided to permit said pivotal movement whilst, at the same time, maintaining the position of the pivotal axis.

8 Claims, 5 Drawing Figures

PIVOT BEARING

This invention relates to a pivot bearing assembly for measuring equipment, which has a bearing member and a supporting member which pivots in relation to the bearing member that part of the support member which lies on the bearing member being knife-shaped, pointed or spherical.

The use of knife-edge bearings in high precision measuring equipment for mounting parts which pivot in relation to each other, is already known. However, these known knife-edge bearings have the disadvantage that the position of the edge in relation to the counter bearing which supports it is not specifically fixed, so that this type of bearing always has to be re-centred; also, vibrations cause displacement of the bearing.

An object of the invention is to create an improved pivot bearing assembly in which these disadvantages are minimised or avoided.

According to the invention, a pivot bearing assembly for measuring equipment comprises a bearing member having a bearing surface thereon, a supporting member engaged with said surface to permit relative pivotal movement between said bearing and support members about a desired pivot axis and flexible retaining means connected between said bearing and support members and arranged to resist relative movement between said members other than pivotal movement about said axis.

In order to make the system rigid, it is preferable for the retaining means to include two double-armed eg., V or U-shaped stays, arranged respectively at opposite side of the supporting member.

It is advantageous for the supporting member to have two rigid fastening portions extending one to each side of the pivot axis to form two connections with the retaining means, said connections being at least approximately in the plane containing the pivot axis.

The invention will now be described by way of example, with reference to the accompanying drawings in which.

Figure 1:
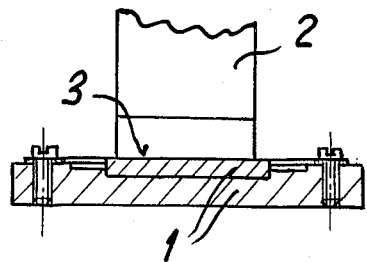
FIG. 1 shows a section along line I—I in FIG. 2 through a first example of a pivot bearing according to the invention.
Figure 2:
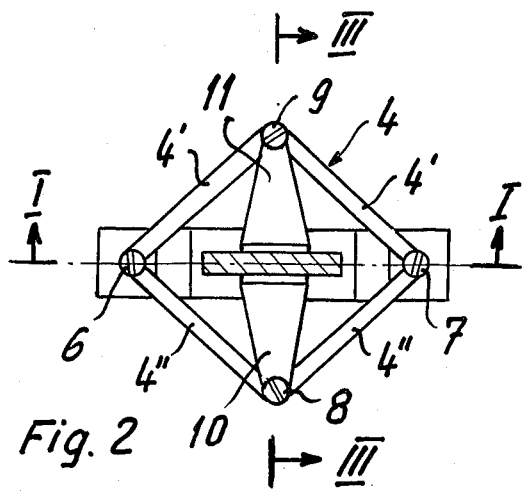
FIG. 2 is a plan view of the pivot bearing illustrated in FIG. 1.
Figure 3:
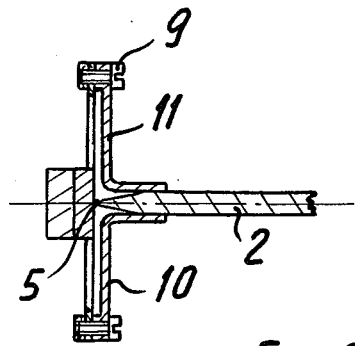
FIG. 3 is a section along line III—III in FIG. 2.

The pivot bearing assembly illustrated in FIGS. 1–3 which, for example, can be used in weighing scales, has a bearing member 1 and a supporting member 2 which pivots in relation to it, the part 3 of the supporting member 2 in contact with the bearing member 1 being knife shaped and therefore forming a knife-edge bearing. This part 3 of the supporting member 2 in contact with the bearing member 1 can, of course, alternatively be pointed or spherical.

In order to maintain the contact point 3 of the supporting member 2 on the bearing member 1, a flexible retaining means 4 of 0.02 mm thick spring steel is provided, parallel to the pivot direction of the supporting member 2, arranged to form the sides of a rhombus in a plane containing the pivot axis 5. Consequently, two V-shaped stays 4' and 4'' which are flexible in the pivot direction, are formed one on each side of the supporting member 2, and retain the contact point 3 of the supporting member 2 on the bearing member 1 in the lateral direction of the supporting member 2.

So that there is no displacement of the contact point 3 of the supporting member 2, and consequently of the pivot axis 5, if the supporting member 2 pivots in relation to the bearing member 1, connecting points 6 and 7, 8 and 9 between the retaining means 4 and bearing and supporting members 1 and 2, are in the plane containing the pivot axis 5.

For connecting the spring steel retaining means 4 and knife-shaped supporting member 2 accurately in the plane containing the pivot axis 5, the supporting member 2 has two additional rigid stays or fastening portions 10 and 11, one on each side of pivot axis 5 and extending at least approximately in a plane containing this axis, to form two connecting points 8 and 9 with the retaining means 4 located in the plane containing the pivot axis 5.

In order to achieve the minimum possible temperature influence, it is advisable for all the parts connected with the retaining means, and the retaining means itself, to consist of materials having as far as possible the same temperature expansion coefficient.

In the pivot bearing shown in FIGS. 1 to 3, a straight edge lies on a single flat surface. The edge and the flat surface can be produced very accurately so that a relatively simple, but nevertheless highly precise knife-edge bearing is formed with an accurately fixed position for the pivot axis 5.

Figure 4:
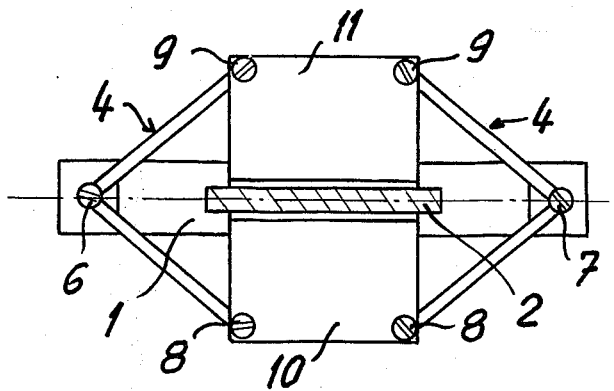
FIG. 4 is a plan view of a second example of a pivot bearing according to the invention.

FIG. 4 shows a plan view of a slightly modified version of a pivot bearing in which the contact point 3 of the supporting member 2 is fixed in relation to the bearing member 1 by means of two flexible, spring steel sections constituting the retaining means 4.

Figure 5:
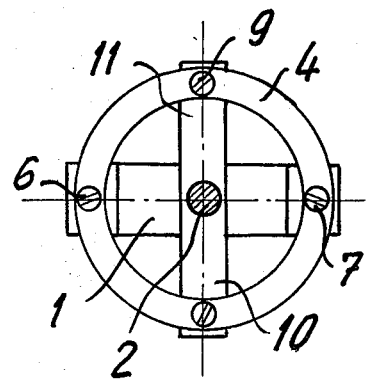
FIG. 5 is a plan view of a third example of a pivot bearing according to the invention.

A plan view of a further embodiment of the invention in the form of a swivel bearing is illustrated in FIG. 5, the part of the supporting member which lies on the bearing member being pointed or spherical, and the retaining means 4 being circular.

It is also possible to use an elliptical retaining means 4 instead of a circular one.

In order to minimise the effect of heat on the pivot bearing of the invention, it is an advantage if the retaining means consists of a material, the heat expansion coefficient of which is less than $6.10^{-6\circ-1}$. An example of one such material is invar steel, the heat expansion coefficient of which is $2.10^{-6\circ-1}$.

I claim:

1. A pivot bearing assembly for use in measuring equipment, such as precision weighing scales, said pivot bearing assembly comprising a bearing member having a bearing surface thereon, a supporting member engaged with said surface to permit relative pivotal movement between said bearing and support members about a desired pivot axis, flexible retaining means connected between said bearing member and support member and arranged to resist relative movement between said members other than pivotal movement about said pivot axis, said flexible retaining means extending at least approximately in a plane containing said pivot axis and being connected between said bearing and support members at predetermined locations at least approximately in said plane, a pair of said predetermined locations being disposed respectively at each side of the bearing member in alignment with said pivot axis and at least approximately in said plane containing said axis.

2. The pivot bearing assembly of claim 1 wherein said retaining means comprises two double-armed stays disposed respectively on opposite sides of said supporting member.

3. The pivot bearing assembly of claim 1 wherein said retaining means is circular in shape.

4. The pivot bearing assembly of claim 1 wherein said retaining means is elliptical in shape.

5. The pivot bearing assembly of claim 1 further including additional fastening portions on said supporting member, said additional fastening portions including two rigid stays extending one to each side of said pivot axis and each connected with said retaining means at connections which are at least approximately in the plane containing said pivot axis.

6. The pivot bearing assembly of claim 1 wherein said retaining means is formed of spring steel.

7. The pivot bearing assembly of claim 1 wherein said retaining means is formed of a material having a heat expansion coefficient which is less than $6.10^{-6 \circ -1}$.

8. The pivot bearing assembly of claim 7, wherein said retaining means is formed of invar steel.

* * * * *